(12) United States Patent
Brown et al.

(10) Patent No.: US 10,995,821 B2
(45) Date of Patent: May 4, 2021

(54) BELT CLAMP

(71) Applicant: Gates Corporation, Denver, CO (US)

(72) Inventors: Leslee Brown, Broomfield, CO (US);
Young W. Desanti, Gilbert, AZ (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 16/043,810

(22) Filed: Jul. 24, 2018

(65) Prior Publication Data
US 2020/0032876 A1   Jan. 30, 2020

(51) Int. Cl.
*F16G 3/07* (2006.01)
*F16B 2/06* (2006.01)
*F16G 3/08* (2006.01)

(52) U.S. Cl.
CPC .............. *F16G 3/07* (2013.01); *F16B 2/065* (2013.01); *F16G 3/08* (2013.01)

(58) Field of Classification Search
CPC .................................. F16G 3/07; F16B 2/065
See application file for complete search history.

(56) References Cited

U.S. PATENT DOCUMENTS

| | | | |
|---|---|---|---|
| 5,348,768 A | 9/1994 | Ishihara et al. | |
| 5,878,467 A | 3/1999 | Yokota | |
| 6,357,756 B1 * | 3/2002 | Matovich | F02B 67/06 123/192.2 |
| 8,763,208 B2 * | 7/2014 | Busch | F16G 3/16 24/35 |
| 9,528,577 B2 * | 12/2016 | Johnson | F01L 1/024 |
| 10,088,023 B2 * | 10/2018 | Tamura | B29D 29/08 |
| 2008/0060171 A1 * | 3/2008 | Lindemann | F16G 3/16 24/31 R |
| 2009/0011072 A1 * | 1/2009 | Glaesener | B29C 45/6728 425/595 |
| 2013/0143705 A1 * | 6/2013 | Wolf | F16G 3/08 474/202 |

FOREIGN PATENT DOCUMENTS

| | | |
|---|---|---|
| CN | 207467502 U | 6/2018 |
| DE | 29919550 U1 | 2/2000 |
| EP | 3078880 A1 | 10/2016 |
| JP | S585554 A | 1/1983 |

* cited by examiner

*Primary Examiner* — Victor D Batson
*Assistant Examiner* — David M Upchurch
(74) *Attorney, Agent, or Firm* — Alyssa K. Sandrowitz, Esq.

(57) ABSTRACT

A clamp having a first member, a second member connectable to the first member and a second surface having a first groove and a second groove, each groove for receiving a toothed belt tooth, a peak is disposed between each groove, the second member cooperatively engages the first member to engage the toothed belt there between, and the first member having at least one arcuate concave surface extending across a clamp width, the arcuate concave surface corresponding with the second member peak when the second member is fastened to the first member.

7 Claims, 3 Drawing Sheets

BELT CLAMP

FIELD OF THE INVENTION

The invention relates to a belt clamp, and more particularly, to a clamp comprising at least one arcuate concave surface extending across a clamp width, the arcuate concave surface corresponding with a second member peak when the second member is fastened to a first member.

BACKGROUND OF THE INVENTION

Timing belts are used in various metering, positioning, conveying, and oscillating drives for instruments, mechanisms, tools, etc. Timing belts are formed of durable plastics, such as neoprene and polyurethane, which may be reinforced by tensile metal cords. Timing belts vary in width, the number of teeth, the type of the plastic suitable for the operating conditions imposed upon the timing belt, and other parameters.

Timing belts are available in commonly used, or standard lengths. Where belt lengths are required that are longer than the standard lengths stocked by suppliers and distributors of precision mechanical components, a new, longer belt can be formed from a length of timing belt stock. A clamp is used to join the opposing ends of the length of belt stock into an endless belt. The resulting endless belt is greater in length than standard belts, and is capable of addressing the specific requirements of the user. Belt lengths may also be connected at each end to XY machines for use in pick and pack operations.

Due to manufacturing processes stress risers can be realized between the teeth in the toothed belt. The stress risers can diminish to operating life of the belt by causing premature failure of the tensile cords.

Consequently, the need for a belt clamp which disperses the stress risers thereby extending operating life remains undiminished.

Representative of the art is US patent application 2008/0060171A1 which discloses a belt clamp for securing the free ends of a length of timing belt stock together to form an endless timing belt. The clamp consists of an inverted, U-shaped cover, a U-shaped base, and a fastener that passes through aligned, centrally located apertures in the cover and the base to draw the cover and base together, in an overlapping relationship. A plurality of recesses are formed on the upper surface of the base, and a bed is centrally located and interrupts the recesses. The free ends of the length of timing belt stock are placed on the bed, and are retained in fixed position by the pressure applied by the fastener as the cover and base are drawn together. Protrusions, such as ribs, teeth, or buttons, formed on one, or both sides, of the timing belt stock are pressed into the complementary recesses in the base. A bracket, or other mounting support, may be attached to the upwardly extending pins, or projections, on the upper surface of the belt clamp and a position indicating sensor may be positioned by the projections and/or secured to the bracket, for movement with the belt clamp.

What is needed is a clamp comprising at least one arcuate concave surface extending across a clamp width, the arcuate concave surface corresponding with a second member peak when the second member is fastened to a first member. The present invention meets this need.

SUMMARY OF THE INVENTION

The primary aspect of the invention is to provide a clamp comprising at least one arcuate concave surface extending across a clamp width, the arcuate concave surface corresponding with a second member peak when the second member is fastened to a first member.

Other aspects of the invention will be pointed out or made obvious by the following description of the invention and the accompanying drawings.

The invention comprises a clamp comprising a first member, a second member connectable to the first member and comprising a second surface having a first groove and a second groove, each groove for receiving a toothed belt tooth, a peak is disposed between each groove, the second member cooperatively engages the first member to engage the toothed belt there between, and the first member comprising at least one arcuate concave surface extending across a clamp width, the arcuate concave surface corresponding with the second member peak when the second member is fastened to the first member.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
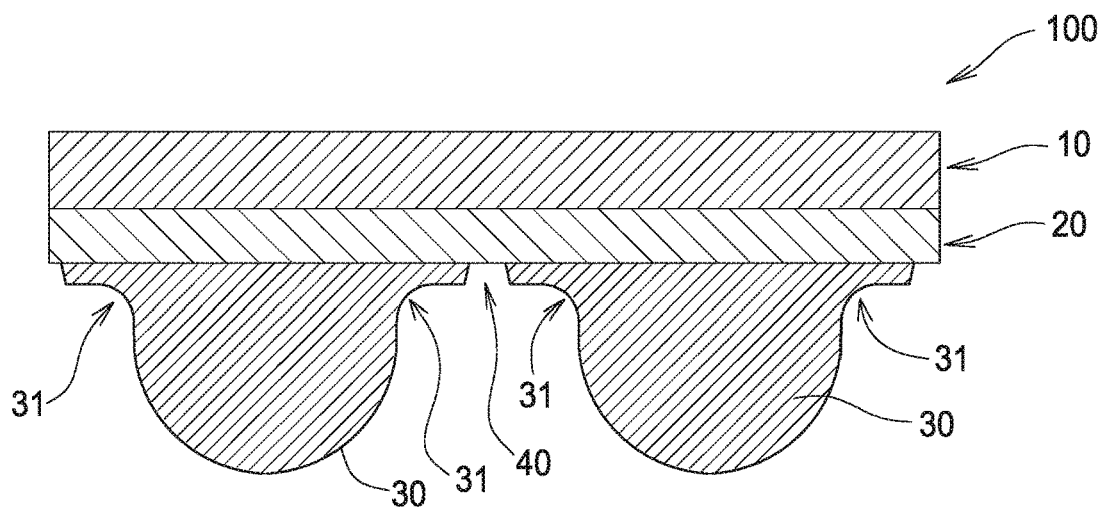
FIG. 1 is a side view of a prior art belt.

FIG. 1 is a side view of a prior art belt. Belt 100 comprises a belt body 10. Belt body 10 may comprise any one of a number of known thermoplastics used in the belt industry, for example, polyurethane or derivatives thereof. Embedded within the belt body is a plurality of tensile cords 20. Tensile cords 20 may comprise carbon fiber, polyester, steel, and nylon to name but a few. The tensile cords extend in a longitudinal direction of the belt.

A plurality of teeth 30 extend from the belt body. The teeth extend across the width of the belt which is normal to the longitudinal direction. The teeth engage cooperating grooves in a sprocket (not shown).

At the base of each tooth is a tooth root 31. The tooth root transitions from the belt tooth to the belt body.

Disposed between each tooth root is a trapezoidal notch 40. Current manufacturing methods for synchronous TPU (thermoplastic polyurethane) belts typically result in trapezoidal notches between the teeth immediately below the tensile cord. When the belt is securely fastened by a clamp, these notches become stress risers that cause cord damage and reduce belt life.

Figure 2A:
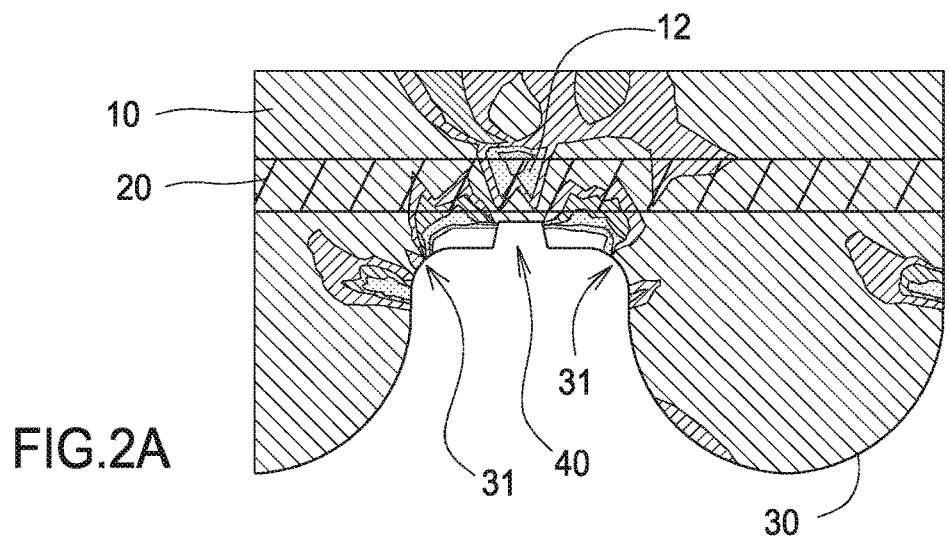
FIG. 2A is a detail of FIG. 1.

FIG. 2A is a detail of FIG. 1. A stress riser 12 is illustrated adjacent to the tensile cord 20. Stress risers 12 are disposed between belt teeth 30 and can be localized on the tensile cords. Stress risers can contribute to premature failure of the tensile cords and therefore the belt. Stress riser 12 is depicted by shading in the Figure.

Figure 2B:
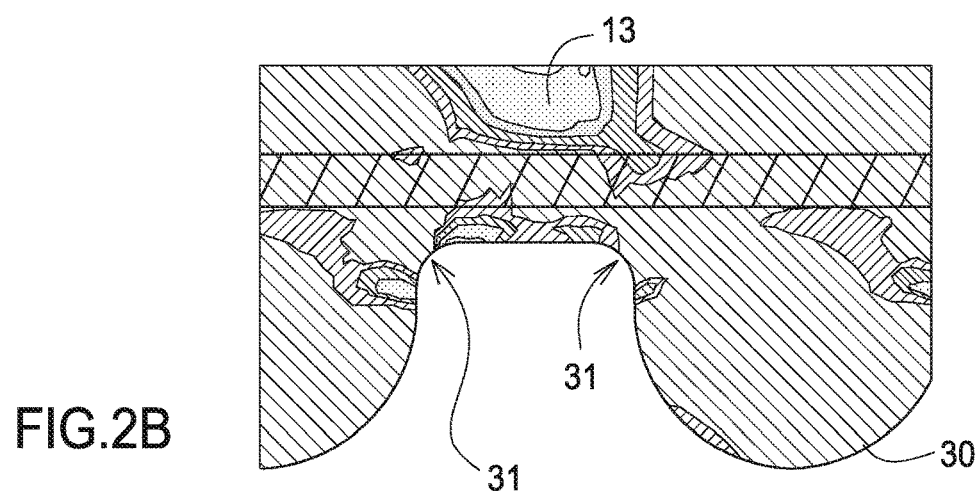
FIG. 2B is an alternate embodiment of FIG. 2A.

FIG. 2B is an alternate embodiment of FIG. 2A. In the absence of notch 40, stress riser 13 is disposed in the upper portion of the body 10 opposite the teeth 30. Stress riser 30 can also contribute to premature failure of the belt. The inventive clamp diminishes the magnitude of the described stress risers (12, 13) which enhances the operating life of the belt. Stress riser 13 is depicted by shading in the Figure.

Figure 3:
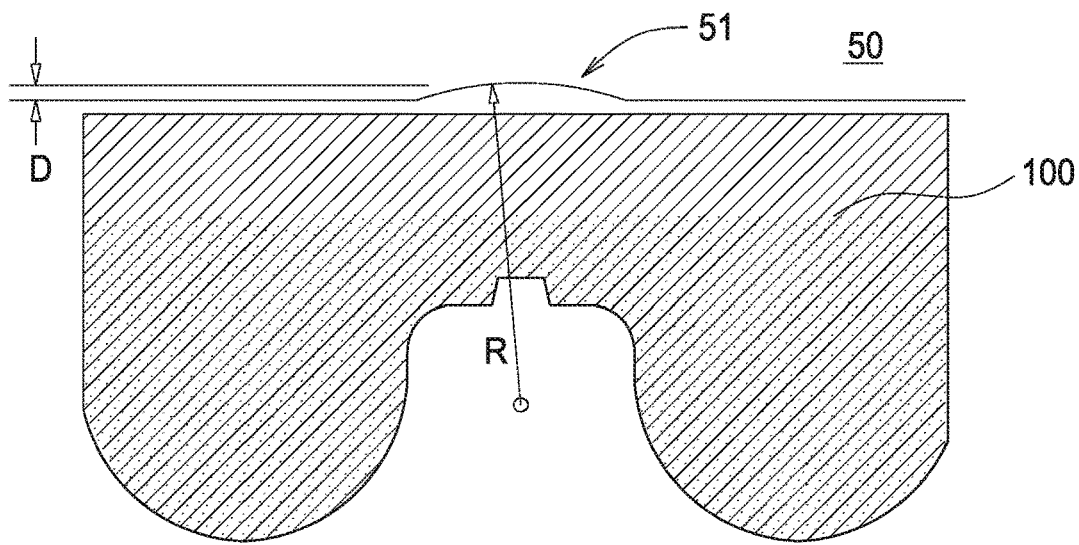
FIG. 3 is a side view of the clamp with a toothed belt.

FIG. 3 is a side view of the clamp with a toothed belt. The inventive clamp can be used to connect a toothed belt within an XY multi-axis machine, for example.

The inventive clamp incorporates a concave surface profile 51 directly above the trapezoid notch 40. The extra space provided by concave surface 51 alleviates and disperses a significant amount of strain energy accumulated at the tensile cord 20 and trapezoidal notch 40.

Concave surface 51 has a width W2 in the range of approximately 25% to 50% of the tooth pitch. The tooth pitch is the distance between the crowns of adjacent teeth.

The radius R of concave surface 51 is approximately 75% to 200% of the tooth pitch. Depth D is typically 10% of the tooth pitch. The inventive clamp with the transverse concave surface can reduce stress risers occurring above notch 40 from 18% to 55%. The amount of strain energy absorption is significant and the energy is dispersed along the upper layer of body 10 instead of concentrating at the trapezoidal notch 40 and tensile cord 20.

Figure 4:
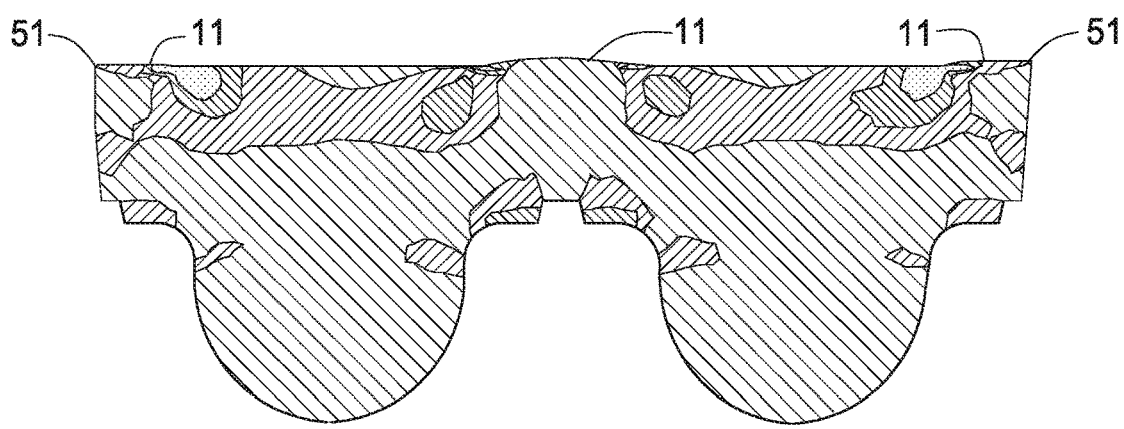
FIG. 4 is a side view of the clamp with a toothed belt.

FIG. 4 is a side view of the clamp with a toothed belt. Belt body protrusion 11 is shown expanded into concave surface 51. Stress risers at protrusion 11 are significantly diminished when compared to the stress risers shown in FIG. 2A and FIG. 2B.

Figure 5:
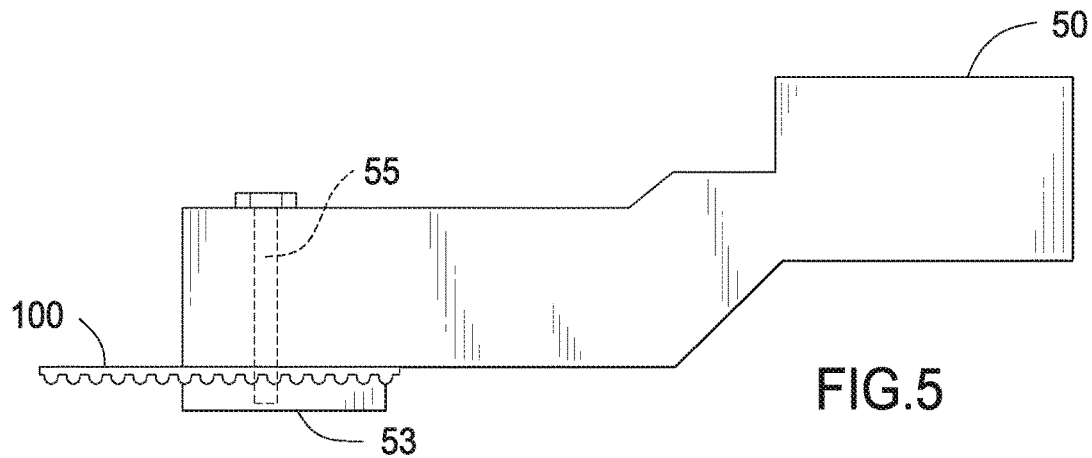
FIG. 5 is a side view of the clamp with a toothed belt.

FIG. 5 is a side view of the clamp with a toothed belt. Clamp 50 comprises upper portion 57 and lower portion 53. Portion 53 is fastened to portion 57 by a fastener 55. Fastener 55 may comprise a bolt or screw. Belt 10 is gripped between portion 57 and portion 53. Portion 53 comprises a grooved profile 54 which cooperates with the toothed profile of belt 10.

Figure 6:
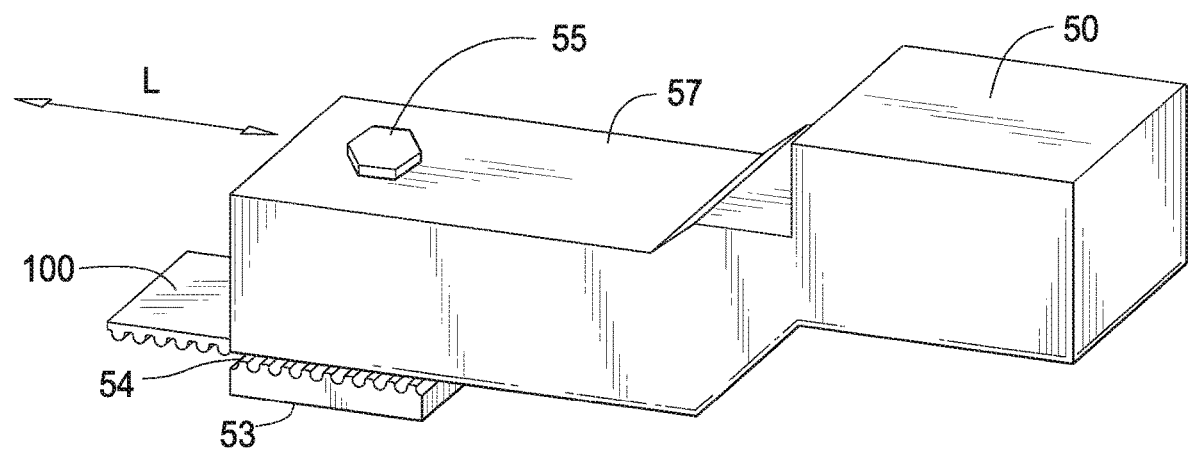
FIG. 6 is a perspective view of the clamp with a toothed belt.

FIG. 6 is a perspective view of the clamp with a toothed belt. Clamp 50 can be engaged with an XY machine component (not shown) as may be required by a user. For example, it can be part of a warehouse automatic storage and retrieval system (ASRS).

Figure 7:
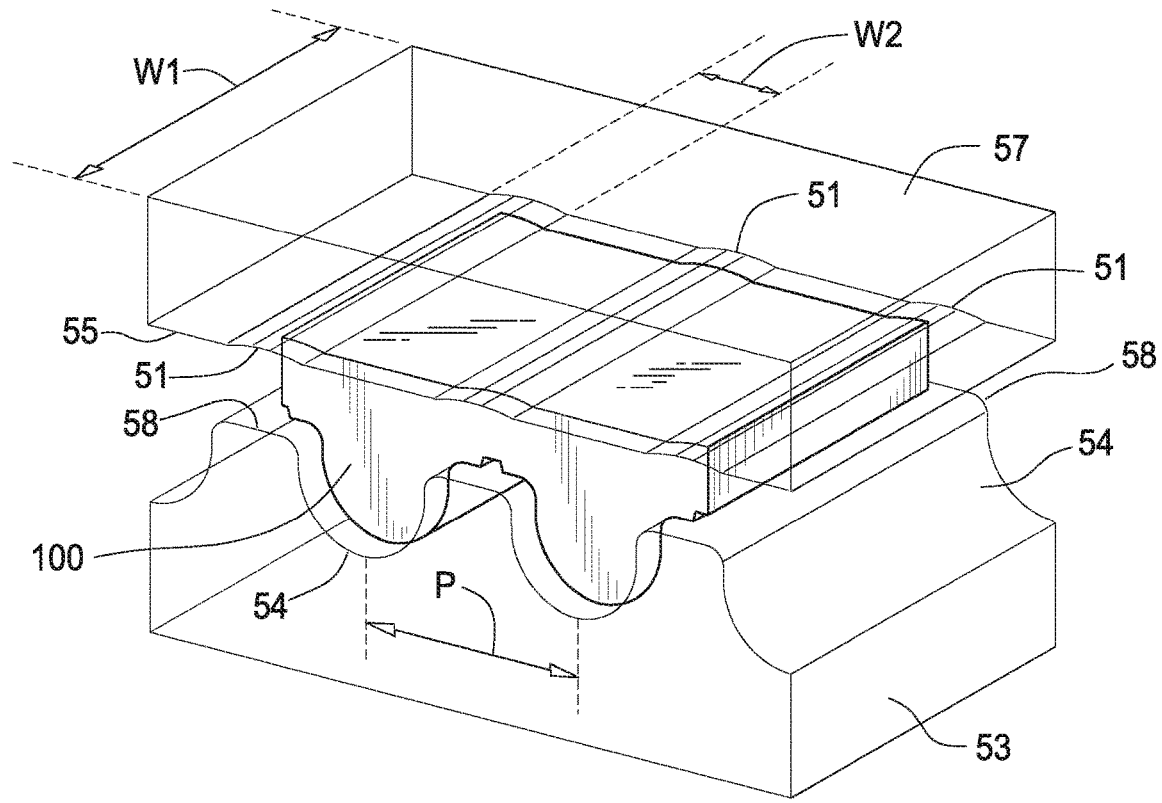
FIG. 7 is a transparent perspective view of the clamp with a toothed belt.

FIG. 7 is a transparent perspective view of the clamp with a toothed belt. This wireframe depiction shows portion 57, portion 53 and belt 10. Belt 10 has an approximate width W1. A clamp width and belt width are approximately the same. Each concave surface 51 cooperatively corresponds with and is opposite a peak 58 of portion 53. Each peak 58 engages a belt groove. The spacing between the center of adjacent grooves is the groove pitch P. Given cooperative engagement between the clamp and the belt, the groove pitch and tooth pitch are equivalent, namely, P.

Although forms of the invention have been described herein, it will be obvious to those skilled in the art that variations may be made in the construction and relation of parts without departing from the spirit and scope of the invention described herein. Unless otherwise specifically noted, components depicted in the drawings are not drawn to scale. Numeric examples are used to illustrate the invention and are not intended to limit the breadth of the claims. Further, it is not intended that any of the appended claims or claim elements invoke 35 U.S.C. § 112(f) unless the words "means for" or "step for" are explicitly used in the particular claim. The present disclosure should in no way be limited to the exemplary embodiments or numerical dimensions illustrated in the drawings and described herein.

We claim:

1. A clamp comprising:
a first member;
a second member connectable to the first member and comprising a second surface having a first groove and a second groove, each groove for receiving a toothed belt tooth, a peak is disposed between each groove;
the second member cooperatively engages the first member to engage the toothed belt there between; and
the first member comprising at least one arcuate concave surface extending across a clamp width, the arcuate concave surface corresponding with the second member peak when the second member is fastened to the first member.

2. The clamp as in claim 1, wherein the arcuate concave surface having a width W2 in the range of approximately 25% to 50% of a groove pitch.

3. The clamp as in claim 1, wherein the arcuate concave surface comprises a radius R that is approximately 75% to 200% of a groove pitch.

4. The clamp as in claim 1, wherein the depth D of the arcuate concave surface is approximately 10% of a groove pitch.

5. The clamp as in claim 1, wherein the clamp diminishes a stress riser between adjacent belt teeth and localized on a belt tensile cord.

6. A clamp comprising:
a first member;
a second member connectable to the first member and comprising a second surface having at least a first groove and a second groove, the first groove and the second groove spaced by a groove pitch, each groove cooperatively receiving a toothed belt tooth, a second member peak disposed between each groove;
the second member cooperatively engages the first member to engage the toothed belt there between;
the first member comprising at least one arcuate concave surface extending across a clamp width, the arcuate concave surface cooperatively corresponding with the second member peak when the second member is fastened to the first member; and
the arcuate concave surface having a width W2 in the range of approximately 25 to 50% of the groove pitch.

7. A clamp comprising:
a first member;
a second member having a second surface with at least a first groove and a second groove, each spaced from the other by a groove pitch, each groove for cooperatively receiving a toothed belt tooth, a second member peak disposed between each groove;
the second member cooperatively engages the first member to engage the toothed belt there between;
the first member comprising at least one arcuate concave surface extending across a clamp width, the arcuate concave surface cooperatively disposed with the second member peak when the second member and the first member are in engaged relation with the toothed belt there between; and
the arcuate concave surface having a width W2 in the range of approximately 25% to 50% of the groove pitch and a depth of approximately less than 10% of the groove pitch.

* * * * *